UNITED STATES PATENT OFFICE.

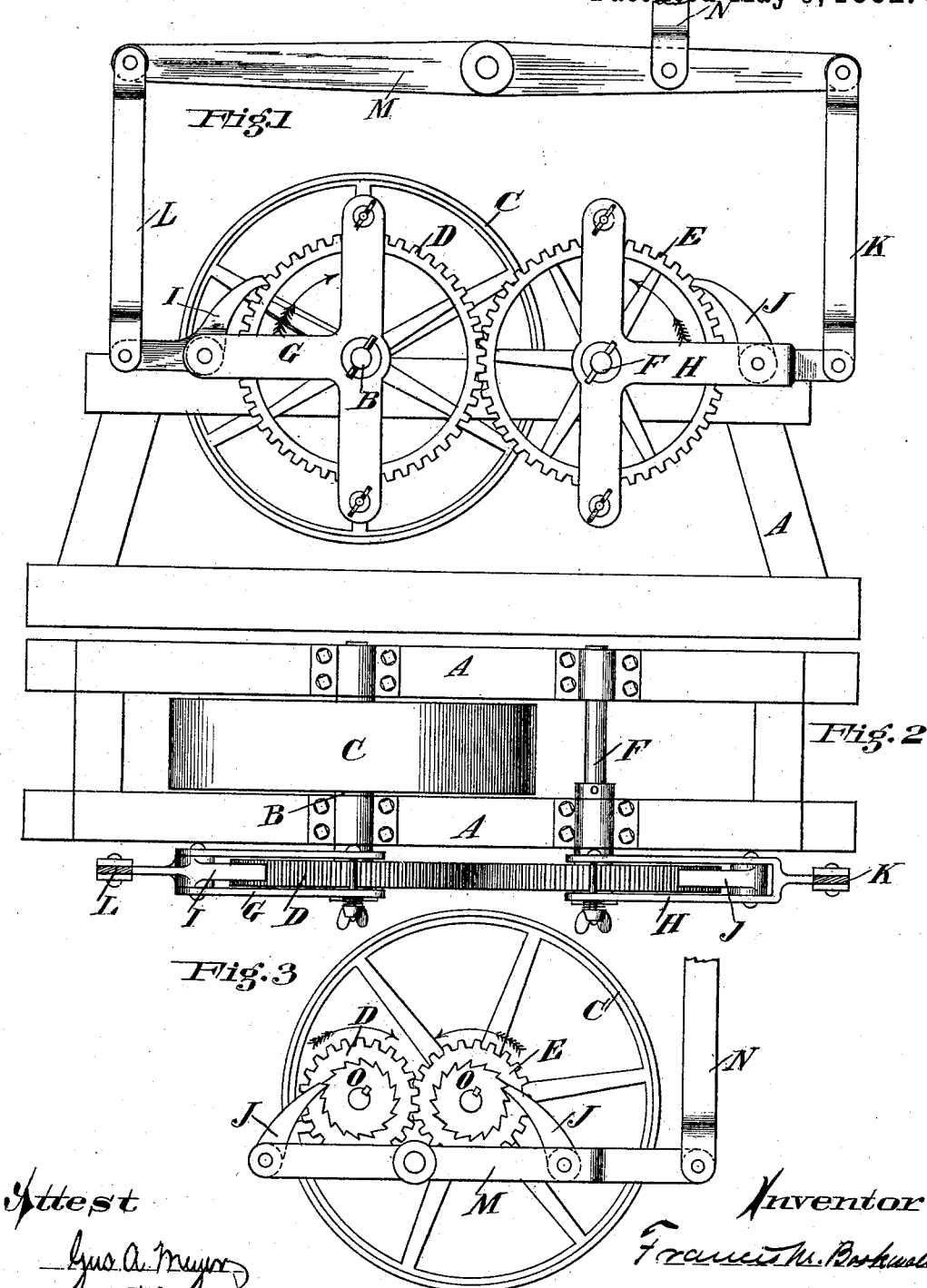

FRANCIS M. BOOKWALTER, OF SPRINGFIELD, OHIO.

POWER-CONVERTER.

SPECIFICATION forming part of Letters Patent No. 257,461, dated May 9, 1882.

Application filed March 31, 1882. (No model.)

*To all whom it may concern:*

Be it known that I, FRANCIS M. BOOKWALTER, a citizen of the United States, residing at Springfield, in the county of Clarke and State of Ohio, have invented certain new and useful Improvements in Power-Converters for Converting Reciprocating into Rotary Motion, of which the following is a full, clear, and exact description.

My invention is designed especially as a power-converter for wind-engines where the pump-rod has a vertically-reciprocating motion, and where it is desirable to use the power of the wheel for running small machinery where it is necessary to convert reciprocating into rotary motion.

The novelty consists in the construction, combinations, and arrangements of the parts, as will be herewith set forth and more specifically claimed.

In the accompanying drawings, Figure 1 is a side elevation of my improved motor-engine. Fig. 2 is a plan view of the same. Fig. 3 is a side elevation of a modification of the construction.

The same letters of reference indicate like parts in all the figures.

In any suitable frame-work, A, is journaled a shaft, B, upon which is keyed or otherwise fastened the driving-wheel C. This wheel may be a plain belt-wheel, as shown, or it may be a sprocket or a gear wheel, as desired, for communicating motion to the machinery to be run. Upon the same shaft, which is in fact the driving-shaft, is keyed or otherwise fastened a gear-wheel, D. Meshing with this wheel D is a second gear-wheel, E, of the same diameter as the wheel D, and which is secured upon a spindle or suitable shaft, F, journaled in the frame A.

G and H are any properly-constructed pawl-carriers pivoted upon the shafts B and F, respectively, and carrying pivoted dogs or pawls I and J, which are adapted to engage with the wheels D and E, respectively.

M is the centrally-pivoted vibrating beam, actuated by the pump-rod or reciprocating prime mover N. From the ends of the beam M extend pivoted links or other connections, which are attached either to a projection of the dog I or else to the carrier H, as shown. The construction is such that the vibration of the beam M causes the continuous revolution of the driving-wheel in one direction, as indicated by the arrow.

When the driving-wheel is being driven directly by the wheel D and dog I the wheel E becomes an idle wheel and its dog J is being retracted for a new engagement. The reverse stroke of the beam M causes the wheel E to become the driving-wheel while the dog I is being retracted, thus keeping the wheel C continuously revolving.

In Fig. 3 the links L and K are dispensed with, and the beam M is made to carry the dogs J directly. The pump-rod in this case is pivoted to an extension of the vibrating beam, as shown, and the dogs may either engage with the gear-wheels D and E or with supplemental ratchet-wheels O, as shown.

If desired, ratchet-wheels may be used in the construction shown in Figs. 1 and 2; but I prefer to dispense with them.

Having thus fully described my invention, I claim—

In a power-converter, the combination, with a vibrating beam actuated by a reciprocating prime mover and a driving-wheel, of two meshing gear-wheels, the one of which is secured upon the shaft of the driving-wheel and the other upon an independent journal, and dogs with connecting mechanism actuated alternately by the vibrating beam and engaging with said meshing gear-wheels, whereby the driving-wheel is caused to revolve continuously in one direction, substantially as described.

FRANCIS M. BOOKWALTER.

Witnesses:
JERE. F. TWOHIG,
GUS. A. MEYER.